United States Patent [19]

Vasiliev et al.

[11] 3,939,336

[45] Feb. 17, 1976

[54] APPARATUS FOR ANALYSIS OF NETWORK DIAGRAMS

[76] Inventors: Vsevolod Viktorovich Vasiliev, Prospekt 40 let., Oktyabrya 82, kv. 60; Alexandr Georgievich Dodanov, Dneprovskaya naber. 119, kv. 140; Alla Nikolaevna Klepikova, ul. Grekova 13 kv. 16; Anatoly Grigorievich Timoshenko, Brest-Litovsky prospekt, 4, kv. 44, all of Kiev, U.S.S.R.

[22] Filed: Dec. 2, 1974

[21] Appl. No.: 528,698

Related U.S. Application Data

[63] Continuation-in-part of Ser. No. 432,648, Jan. 11, 1974, abandoned, Continuation of Ser. No. 316,710, Dec. 20, 1972, abandoned, which is a continuation of Ser. No. 98,275, Dec. 15, 1970, abandoned.

[52] U.S. Cl. .................................. 235/184; 235/185
[51] Int. Cl.² ...................... G06G 7/48; G06F 15/56
[58] Field of Search ............. 235/184, 185; 34/24 R, 34/24 A, 24 B, 24 C

[56] References Cited
UNITED STATES PATENTS 3,474,240  10/1969  Marquis et al. ..................... 235/185
3,558,868  1/1971  Sauvan et al. ..................... 235/185

FOREIGN PATENTS OR APPLICATIONS
227,716  9/1968  U.S.S.R. .............................. 235/184
230,527  10/1968  U.S.S.R. .............................. 235/184

*Primary Examiner*—Felix D. Gruber
*Attorney, Agent, or Firm*—Holman & Stern

[57] ABSTRACT

An apparatus for analysis of network diagrams, comprising a branch model unit wherein the branch models are connected to one another in accordance with the topology of the network diagram by means of a patch board, and a control unit connected to the branch model unit. Each branch model of said branch model unit includes a time interval forming unit, which time interval corresponds to the length of the respective branch, and an indication unit having three terminals, one of these terminals being connected to the output of the time interval forming unit, the second terminal being connected to the input of the latter, and the third terminal serving as the end point of the respective branch model, the starting point of this branch model being the input of the time interval forming unit. The control unit includes a calendar device, both the calendar device and control subunit being connected to a pulse generator.

11 Claims, 28 Drawing Figures

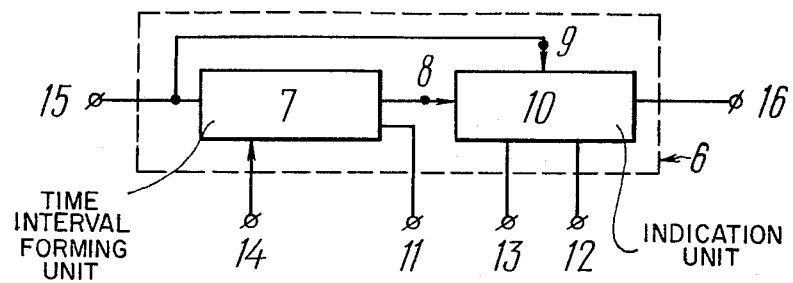
FIG. 4
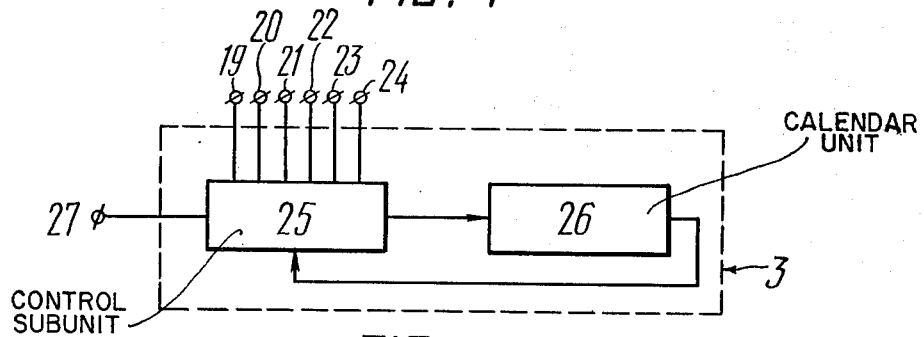
FIG. 6
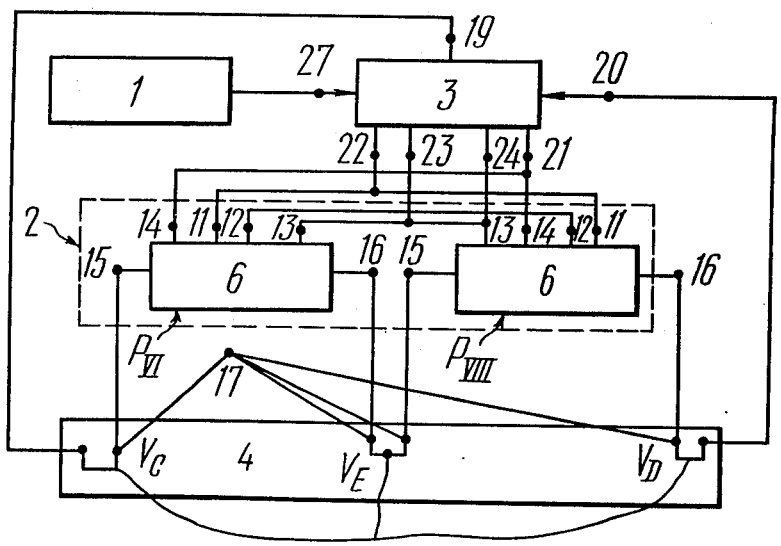
FIG. 5a
FIG. 5b

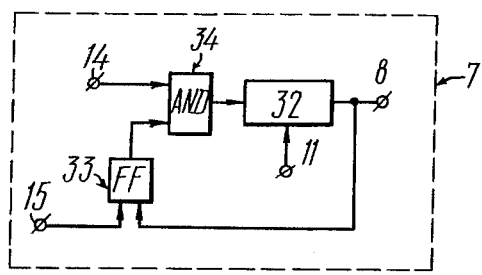
FIG. 9
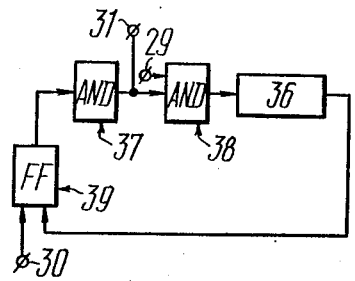
FIG. 12
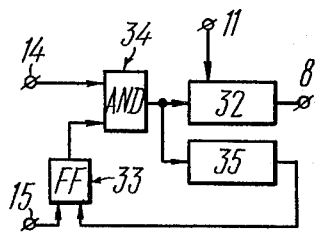
FIG. 10

FIG. 11
FIG. 14
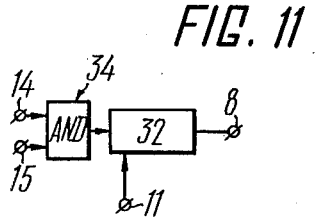
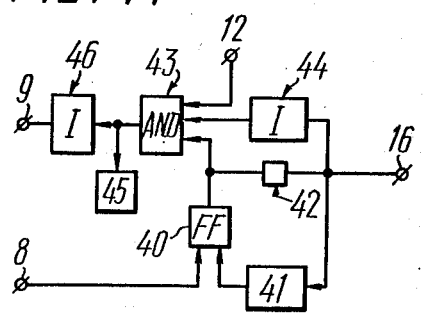

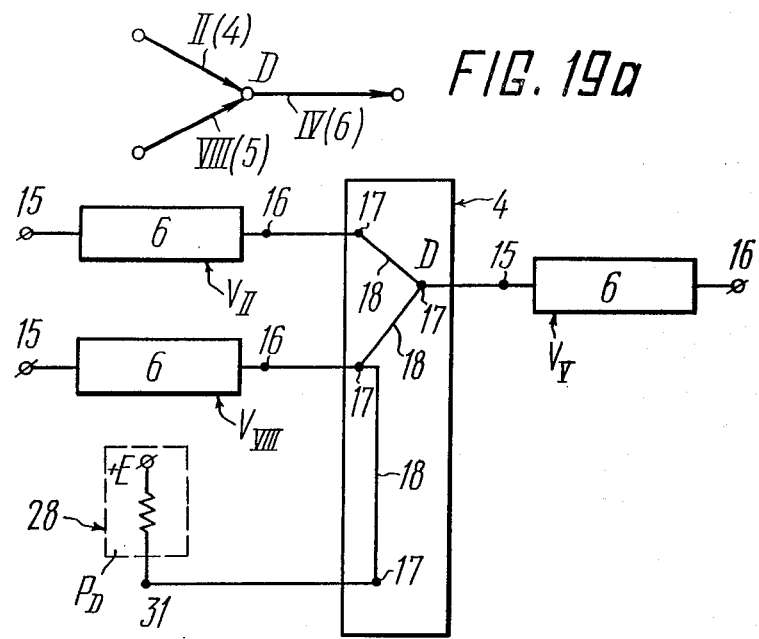
FIG. 19a
FIG. 19b
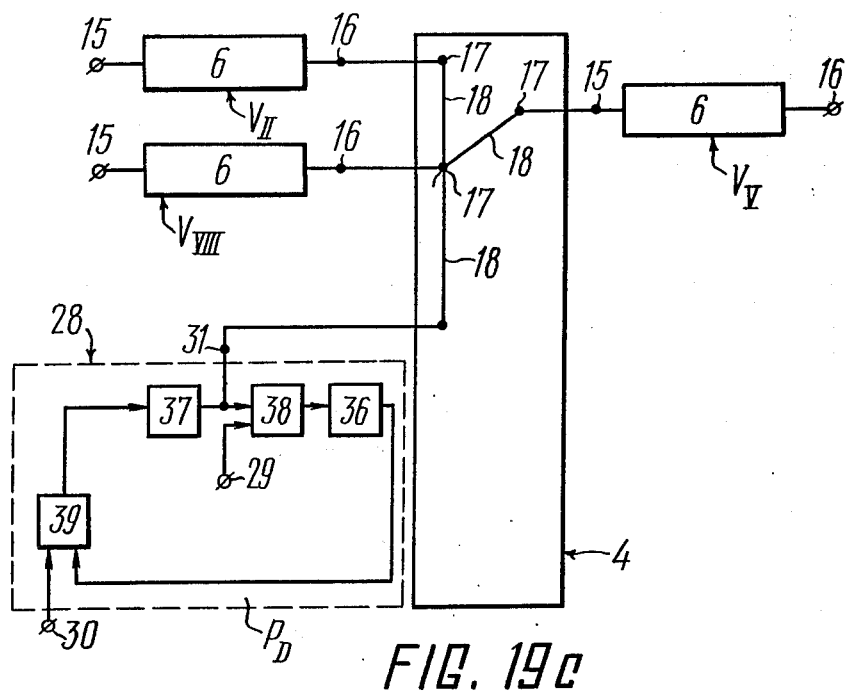
FIG. 19c

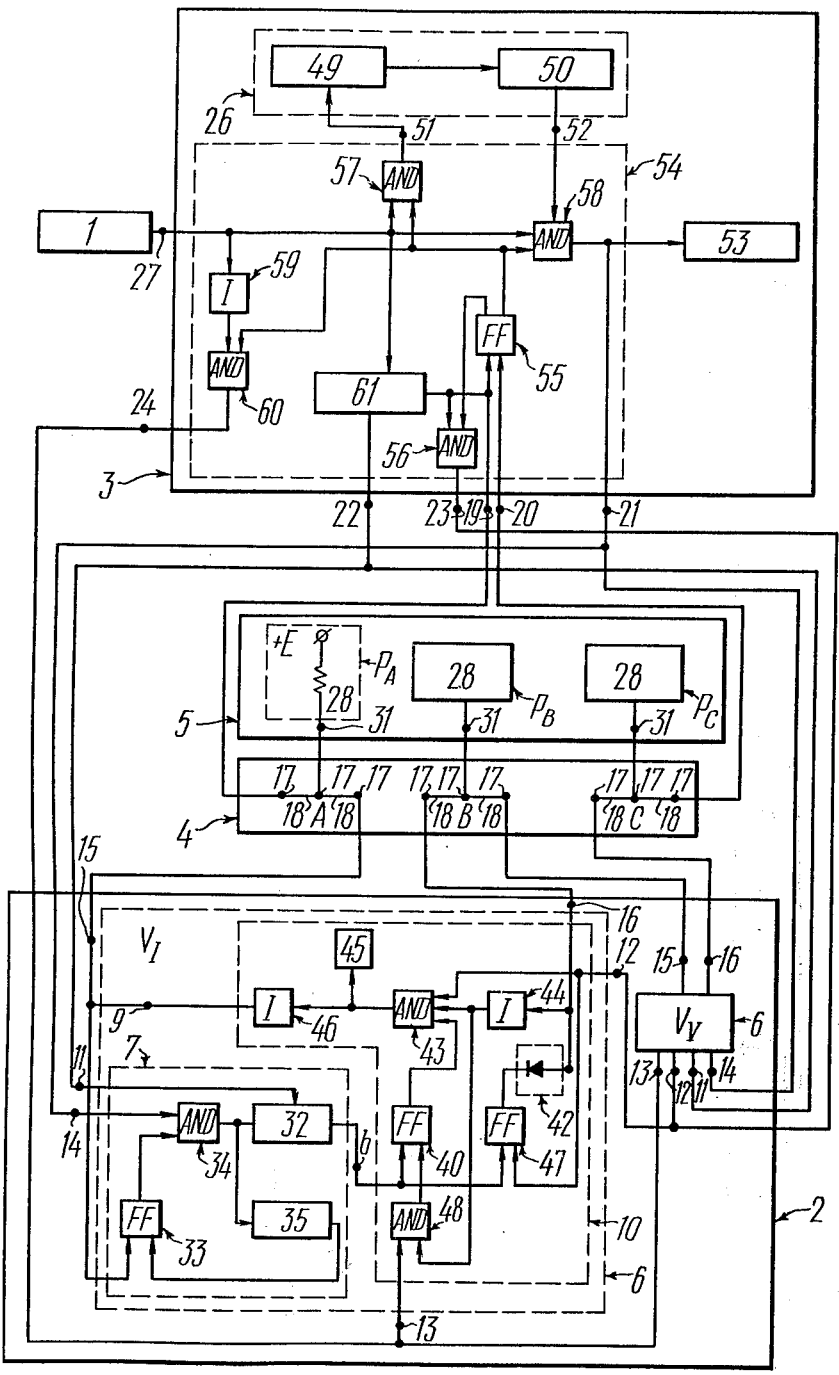

APPARATUS FOR ANALYSIS OF NETWORK DIAGRAMS

This continuation-in-part of Ser. No. 432,648 filed Jan. 11, 1974, now abandoned, which was a continuation of Ser. No. 316,710 filed Dec. 20, 1972, now abandoned, which in turn was a continuation of Ser. No. 98,275 filed Dec. 15, 1970, now abandoned.

BACKGROUND OF THE INVENTION

The present invention relates to a computing technique, and more particularly to an apparatus for analysis of network diagrams and can be used when constructing special-purpose computers for time-saving and graphic analysis of network graphs with visual representation of situations in various fields of science and technology, in biological systems, etc;

The contents of branches may be different in each particular case (cf. Joseph J. Moder, Cecil R. Phillips, Project Management with CPM and PERT, Reinhold Publishing Corporation, Chapman and Hall Ltd;, London-New York, 1964).

There are known analogue apparatus for the analysis of network diagrams, comprising a branch model unit in which the branch models are interconnected in accordance with the topology of the network by means of a patch board and connected to a control unit. Structurally, a branch model of the branch model unit is a device which simulates a predetermined time interval corresponding to the length of the respective branch. The branch model incorporates a circuit for determining the branch pertaining to the longest path from the initial node to a selected node, while the configuration of this path is determined by means of an indication circuit incorporated in the known apparatus.

However, the prior art apparatus for analysis of network diagrams suffers from serious disadvantages arising from the necessity of connecting, by means of the patch board, two input and three output ends of each branch model to an equal number of input and output ends of the subsequent branch models. This substantially increases the time spent on preparing the problem on the patch board; moreover, it calls for a great number of commutated channels, whereby the reliability of the preformance of the apparatus is affected and the operator's work is hampered.

The known apparatus fail to provide for determining directly the calender terms of the time characteristics, which renders the use of this apparatus in man-machine systems inconvenient.

OBJECT OF THE INVENTION

It is an object of the present invention to provide an apparatus permitting the time-saving, graphic and highly accurate analysis of various situations occurring at the network.

SUMMARY OF THE INVENTION

This and other objects are attained by the apparatus for analysis of network diagrams. It comprises a unit of branch models interconnected in accordance wth the topology of the network by means of a patch board and a control unit associated with the branch model unit. Each branch model of said branch model unit includes, according to the invention, a unit for forming a time interval corresponding to the length of the respective branch and an indication unit having three terminals, one of the terminals being connected to the output of said time interval forming unit, the second terminal being connected to the input of said time interval forming unit, and the third terminal serving as the end point of said respective branch model. The starting point of said branch model is the input of said time interval forming unit. The control unit includes a calendar device and a control subunit connected to said calendar device, said calendar device and control subunit being connected to a pulse generator.

It is advisable that the time interval forming unit of said branch model should include a main pulse counter and a time interval forming flip-flop whose one input is the input of said time interval forming unit, the other input is connected to the output of said main pulse counter, and the output is connected via an AND circuit to the input of said counter, the other input of the AND circuit being connected to said pulse generator.

It is also advisable that the time interval forming unit of said branch model include at least one auxiliary pulse counter having its input connected to the input of said main pulse counter and its output connected to the other input of said flip-flop, the output of said time interval forming unit being the output of said main pulse counter.

An apparatus for analysis of network diagrams in accordance with the present invention may comprise a node model unit made up of a plurality of individual node models in the form of single-terminal devices connected by means of said patch board to said branch models in accordance with the topology of the network diagram.

A node model may be in the form of a resistor whose one end serves as the terminal of said node model and the other end is connected to a power supply.

A node model may comprise a regeneration counter of the time intervals of respective branch models having their end points connected to said node model, and a regeneration flip-flop the input whereof is connected to the output of said regeneration counter and the output is connected to the input of said counter via at least two series-connected AND circuits, the free input of the last AND circuit being connected to said pulse generator and the output of the first AND circuit being the terminal of said node model.

In the latter case, said time interval forming unit of said branch unit may include a main pulse counter and an AND circuit having one of its inputs connected to said pulse generator, the other input serving as the input of the entire time interval forming unit, and the output being connected to the input of said main pulse counter whose output is connected to the first terminal of said indication unit.

The indication unit of said branch model may comprise a flip-flop having its first input connected to the output of said time interval forming unit, the other input connected via a feedback circuit to the output of said branch model and the output connected via a diode to the same branch model output, and an AND circuit one input whereof is connected to the output of said flip-flop, the other input is connected via an inverter to the output of said branch model, and the output is connected via a second inverter to the input of said time interval forming unit and to an indication element.

Alternatively, said indication unit may comprise an indication flip-flop having one of its inputs connected to the output of said time interval forming unit, the other input connected via a feedback circuit to the output of said branch model, a time interval termination flip-flop having its input connected to the output of the time interval forming unit and the output connected to the output of said branch model, and an AND circuit one input whereof is connected via an inverter to the output of said branch model, the other input is connected to the output of said indication flip-flop, and the output is connected via a second inverter to the input of the time interval forming unit and to an indication element.

Alternatively, the indication unit of said branch model may include an indication flip-flop having one of its inputs connected to the output of said time interval forming unit and the other input connected via an AND circuit to said pulse generator, a time interval termination flip-flop having its input connected to the output of the time interval forming unit and the output connected via a diode to the output of said branch model, and a second AND circuit one input whereof is connected to the output of said indication flip-flop, the other input is connected via an inverter to the output of said branch model and to the second input of the first AND circuit, and the output is connected via another inverter to the input of the time interval forming unit and to an indication element.

The calendar device of said control unit may comprise a counter having its input connected to the first output of said control subunit, and a decoder the inputs whereof are connected to the outputs of said counter and the output is connected to the first input of said control subunit.

DESCRIPTION OF THE FIGURES

The invention will now be described in greater detail with reference to preferred embodiments thereof, taken in conjunction with the accompanying drawings, wherein:

FIG. 4 illustrates a branch model, according to the invention;

FIG. 5a is an example of a portion of the network diagram;

FIG. 5b shows an example of connection of branch models by means of a patch board in accordance with the topology of the network diagram, as well as the connection of the control unit to branch models, the pulse generator and patch board terminals, according to the invention;

FIG. 6 is a block diagram of the control unit, according to the invention;

FIGS. 9, 10 and 11 show different embodiments of a time interval forming unit, according to the invention;

FIGS. 12 and 13 show different embodiments of a node model, according to the invention;

FIGS. 14, 15 and 16 show different embodiments of a branch model indication unit, according to the invention;

FIG. 19a is still another example of a portion of the network diagram;

FIG. 19b shows an example of connection of branch models and a node model by means of a patch board in accordance with the topology of the network diagram (portion of FIG. 19a) the branch models being arranged as shown in FIG. 17 and the node model being arranged as shown in FIG. 13, according to the invention;

FIG. 19c shows another example of connection of branch models and a node model by means of a patch board in accordance with the topology of the network diagram (portion of FIG. 19a), the branch models being arranged as shown in FIG. 18 and the node model being arranged as shown in FIG. 12 according to the invention;

FIG. 23a is yet another example of a portion of the network diagram; and

FIG. 23b shows an example of connection of branch models and node models, by means of a patch board in accordance with the topology of the network diagram (portion of FIG. 23a), to one another and to the control unit, as well as the connection of the control unit elements and subunits to one another and to the pulse generator, according to the invention.

DISCUSSION OF THE PREFERRED EMBODIMENT

Consider first an example of a network diagram. As can be seen from FIG. 1, the network diagram has nodes A, B, C, D, E and F representing different events and branches I, II, III, IV, V, VI, VII and VIII representing steps of a production process conducted in accordance with this network diagram. In the network diagram, all the branches are unidirectional, and the events therein perform logical AND functions, i.e. steps whose beginnings are associated with a particular event cannot start until all the steps whose ends are associated with the same event are completed.

For example, steps VI and VIII can only be performed after steps III and V have been completed, while step V can only be performed, in turn, after step I has been completed, etc. Thus, the topology of the network diagram is representative of the interrelationship and sequence of the steps being performed.

Given in brackets next to a step number is the duration of the step, i.e. the duration of step I is equal to 3 units of time, that of step II is equal to 4 units of time, etc.

Node A is the starting event and node F is the final event in this network diagram.

The minimum duration of the entire cycle of steps of the process conducted in accordance with this network diagram is determined by the longest path from the starting event A to the final event F.

Figure 2:
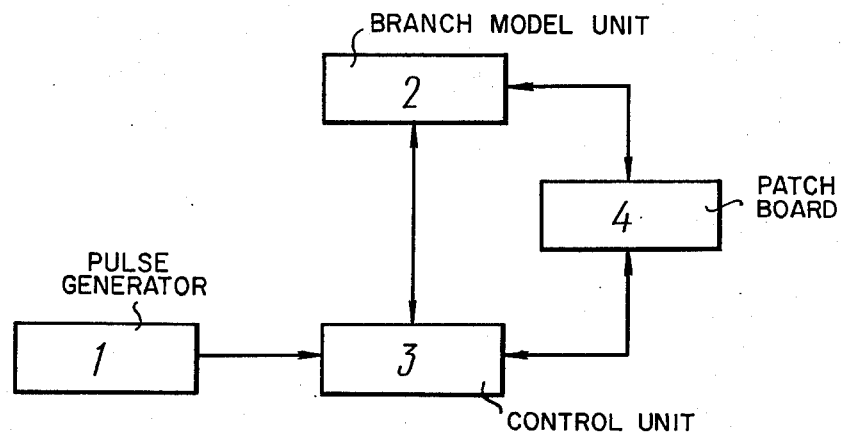
FIGS. 2 and 3 are general block diagrams of an apparatus for analysis of network diagrams, according to the invention.

Referring now to FIG. 2, the proposed apparatus for analysis of network diagrams comprises a pulse generator 1, a branch model unit 2 connected to a control unit 3, and a patch board 4 connected to the branch model unit 2 and control unit 3.

Figure 3:
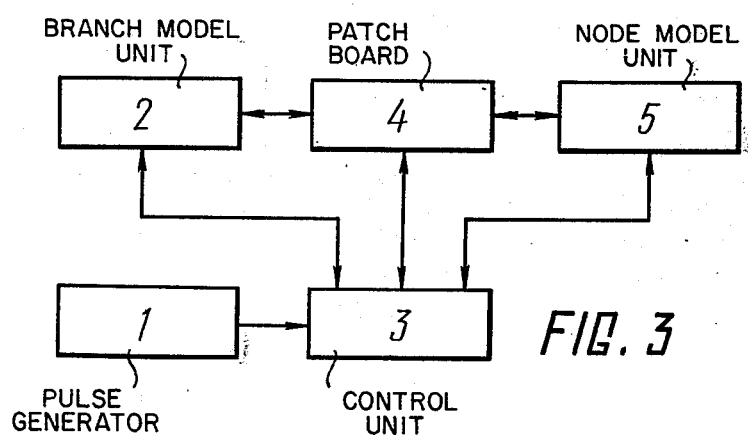

The apparatus of the present invention may additionally comprise a node model unit 5 (FIG. 3) which is connected to the patch board 4 and control unit 3.

The branch model unit 2 is made up of individual branch models 6 (FIG. 4) each including a time interval forming unit 7 connected to terminals 8 and 9 of an indication unit 10. Each branch model 6 has inputs 11, 12, 13, 14, 15 and an output 16.

The inputs 11, 14 and 15 serve as the inputs of the time interval forming unit 7, the inputs 12 and 13 are the inputs of the indication unit 10, and the output 16 is the output of the indication unit 10. The input 15 of each branch model 6 is connected to one of terminal jacks 17 of the patch board 4 (FIG. 5b), while the output 16 of each branch model 6 is connected another terminal jack 17 of the patch board 4. The number of terminal jacks 17 is equal to the total number of inputs 15 and outputs 16 of the branch models 6 of the apparatus for analysis of network diagrams.

The branch models 6 are interconnected by their inputs 15 and outputs 16, in accordance with the topology of the network diagram, through terminal jacks 17 of the patch board 4 with the aid of patch cords 18.

Figure 1:
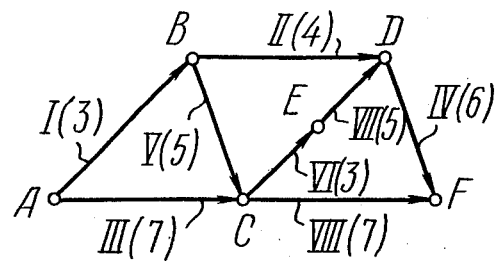
FIG. 1 illustrates a network diagram.

Branch models $P_{VI}$ and $P_{VIII}$ (FIG. 5b) correspond to branches VI and VIII of the network diagram portion shown in FIGS. 1 and 5a. The terminal jack 17 of the patch board 4, connected to the input 15 of the branch model $P_{VI}$, forms a node $V_C$ which, being the starting point of this portion, is connected to an input 19 of the control unit 3.

The terminal jacks 17, connected to the output 16 of the branch model $P_{VI}$ and to the input 15 of the branch model $P_{VIII}$, are interconnected by means of a patch cord 18. Connection $V_E$ of these terminal jacks corresponds to node E of the network diagram portion of FIG. 5a.

The terminal jack 17 connected to the output 16 of the branch model $P_{VIII}$ corresponds to node D and, being the end point of this portion, is connected to an input 20 of the control unit 3.

The inputs 14 of all the branch models 6 are connected to one another and to an output 21 of the control unit 3. The inputs 11 of all the branch models 6 are connected to one another and to an output 22 of the control unit 3. The inputs 12 of all the branch models 6 are connected to one another and to an output 23 of the control unit 3. The inputs 13 of all the branch models 6 are connected to one another and to an output 24 of the control unit 3.

The control unit 3 (FIG. 6) includes a control subunit 25 and a calendar unit 26. The inputs 19, 20, 27 and outputs 21, 22, 23, 24 of the control unit 3 are connected to the control subunit 25, branch models 6 (FIG. 5b) of the branch model unit 2, patch board 4 and pulse generator 1.

Figure 7:
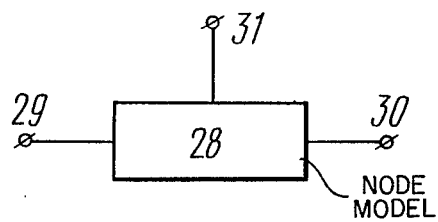
FIG. 7 illustrates a node model, according to the invention.
Figure 8A:
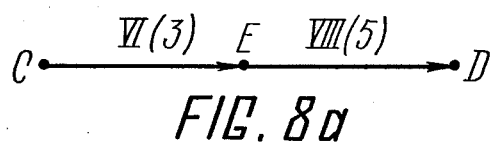
FIG. 8a is another example of a portion of the network diagram.

A node model 28 (FIG. 7) of the node model unit 5 has inputs 29, 30 and a terminal 31. The number of node models 28 is equal to that of events in the network diagram (FIG. 8a)

Figure 8B:
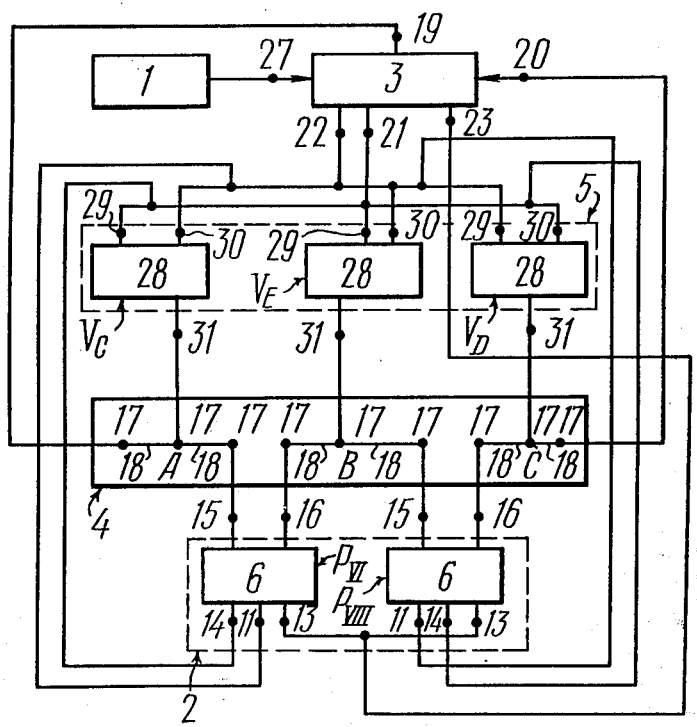
FIG. 8b shows an example of connection of branch models and node models by means of a patch board in accordance with the topology of the network diagram, as well as the connection of the control unit to branch models, node models, patch board terminals and the pulse generator, according to the invention.

The inputs 29 of the node models 28 are connected to one another (FIG. 8b) and to the output 21 of the control unit 3. The inputs 30 are connected to one another and to the output 22 of the control unit 3. The terminal 31 of each node model 28 is connected to a terminal jack 17 of the patch board 4.

Used as the time interval forming unit 7 (FIG. 4) may be delay lines, pulse counters with logical circuits, shift registers, etc.

The time interval forming unit 7 includes a main pulse counter 32 (FIG. 9), a time interval forming flip-flop 33 and an AND circuit 34. The input of the main pulse counter 32 is connected to the "1" output of the time interval forming flip-flop 33 via the AND circuit 34 and to the output 21 of the control unit 3 via the input 14. The output of the main pulse counter 32 is connected to the "0" output of the time interval forming flip-flop 33 and forms the output terminal 8 of the time interval forming unit.

The 1 input of the flip-flop 33 acts as the input 15 of the branch model 6. The terminal 8 of the time interval forming unit 7 is connected to the terminal 8 (FIG. 4) of the indication unit 10, whereas the input 15 is connected to the terminal 9 of the indication unit 10.

The input 11 is connected to the output 22 (FIG. 6) of the control unit 3.

The main pulse counter 32 is intended to store and count the number of pulses, corresponding to the duration of a respective process step, i.e. to the length of a respective branch.

In the initial state, the time interval forming flip-flop 33 is in the 0 state, i.e. in a state when an inhibiting potential is applied to the input of the AND circuit 34. The above structure of the time interval forming unit is quite simple, but in this case the information formerly stored in the pulse counter 32 is erased therefrom after the counter has counted down the number of pulses, corresponding to the length of a respective branch.

The time interval forming unit of FIG. 10 differs from that of FIG. 9 in that is comprises an auxiliary pulse counter 35.

The input of the auxiliary pulse counter 35 is connected to the input of the main pulse counter 32, while the output of the auxiliary pulse counter 35 is connected to the 0 input of the time interval forming flip-flop 33, and the output of the main pulse counter 32 forms the terminal 8 of the time interval forming unit 7. The capacity of the auxiliary pulse counter 35 is equal to that of the main counter 32.

The auxiliary pulse counter 35 is intended for regeneration of the information introduced into the main counter 32.

No information is entered in the auxiliary pulse counter 35 in advance.

The time interval forming unit 7 of the branch model 6 (FIG. 4) may include the AND circuit 34 (FIG. 11) and the main pulse counter 32 whose output serves as the terminal 8 of the time forming unit 7, while one of the inputs of the AND circuit 34 serves as the input 15 of the branch model 6.

In this case, the node model 28 comprises a counter 36 (FIG. 12) of regeneration of the time intervals of AND circuits 37 and 38 and a regeneration flip-flop 39.

The first input of the AND circuit 38 serves as the input 29 connected to the output 21 (FIG. 8b) of the control unit 3, the second input serves as the terminal 31 connected to a terminal jack 17 of the patch board 4, and the output of the AND circuit 38 (FIG. 12) is connected to the input of the counter 36.

The output of the time interval regeneration counter 36 is connected to the 0 input of the flip-flop 39, the 1 input 30 whereof is connected to the output 22 (FIG. 8b) of the control unit 3.

In case the time interval forming units in the branch models 6 are arranged as shown in FIG. 9 or 10, the node model 28 may be in the form of a resistor (FIG. 13), one end whereof is connected to a power supply and the other end serves as the terminal 31 (FIG. 7) of the node model 28.

When the time interval forming units 7 of the branch models 6 are arranged as shown in FIG. 9 or 10, the indication unit 10 comprises an indication flip-flop 40 (FIG. 14), the 1 input whereof serves as the terminal 8 of the indication unit 10, the 0 input is connected via a feedback circuit 41 to the output 16 of the branch model 6, and the output is connected via a diode 42 to the output 16 of the branch model 6, and an AND circuit 43, the first input whereof is connected to the output of the indication flip-flop 40, the second input is connected via an inverter 44 to the output 16 of the branch model 6, the third input is connected via the input 12 to the output 23 (FIGS. 6 and 7) of the control unit 3, and the output (FIG. 14) is connected to an indication element 45 and, via an inverter 46 and the terminal 9, to the input 15 (FIG. 8b) of the branch model 6.

Figure 15:
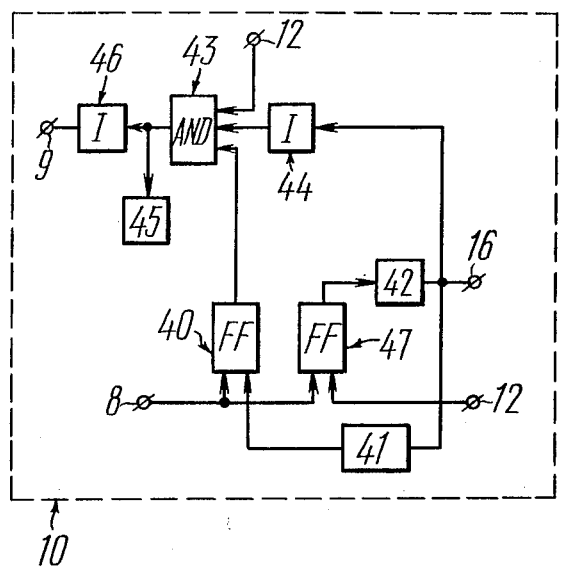

The indication unit 10 (FIG. 15) may additionally comprise a time interval termination flip-flop 47. The input of the flip-flop 47 is connected to the terminal 8 of the indication unit 10, and the output of the flip-flop 47 is connected via the diode 42 to the output 16 of the branch model 6 (FIG. 4).

In the indication unit 10 (FIG. 16), used as the feedback circuit may be an AND circuit 48 having one of its inputs connected to the inverter 44, the other input connected via the input 13 to the output 24 (FIG. 5b) of the control unit 3, and the output connected to the 0 input of the flip-flop 40.

Figure 16:
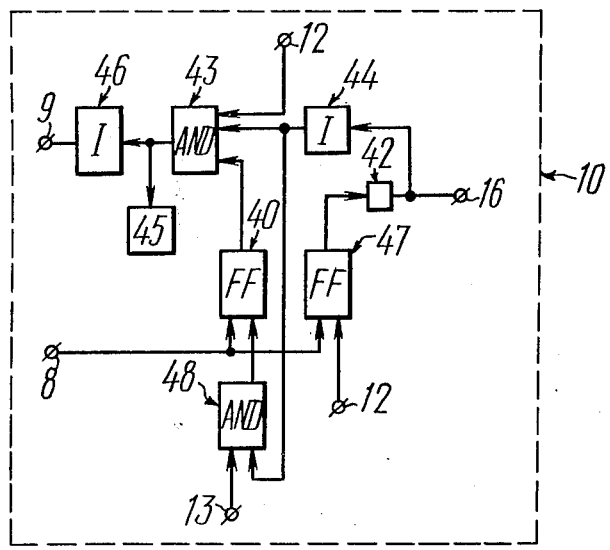
Figure 17:
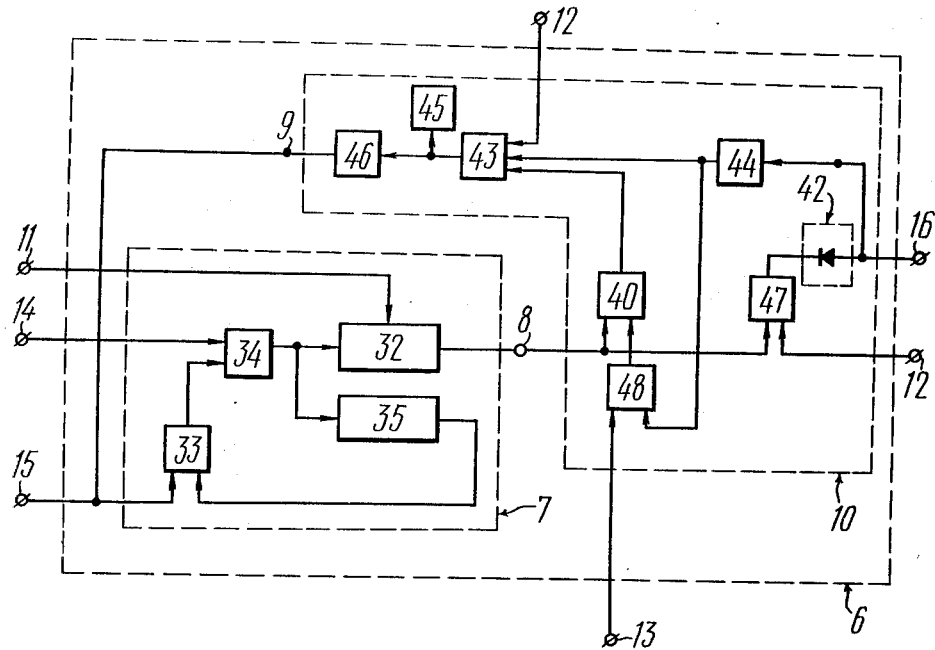
FIG. 17 shows an embodiment of a branch model using the time interval forming unit of FIG. 10 and the indication unit of FIG. 16, according to the invention.

The branch model 6 (FIG. 17) may incorporate the time interval forming unit 7 arranged as shown in FIG. 10 and the indication unit 10 arranged as shown in FIG. 16. The terminal 8 of the indication unit 10 is connected to the output of the main pulse counter 32 of the time interval forming unit 7 and the terminal 9 of the indication unit 10 is connected to the input 15 of the branch model 6.

Figure 18:
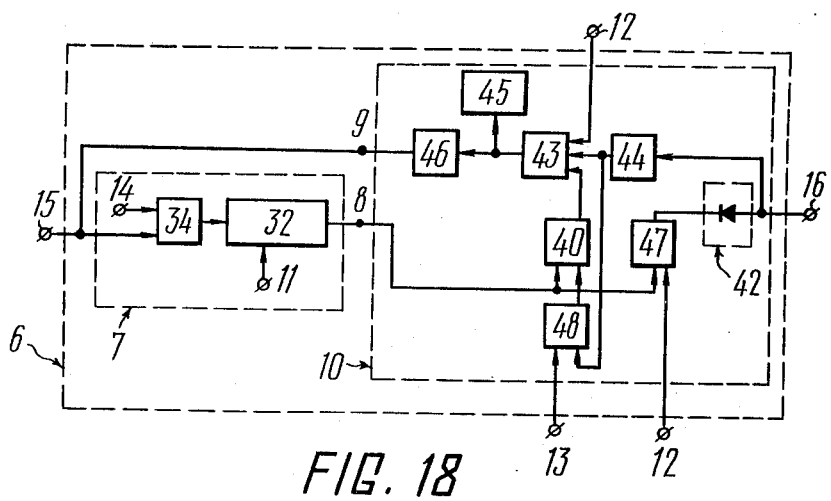
FIG. 18 shows an embodiment of a branch model using the time interval forming unit of FIG. 11 and the indication unit of FIG. 16, according to the invention.

In the branch model 6 (FIG. 18), the time interval forming unit 7 may be arranged as shown in FIG. 11 and the indication unit 10 may be arranged as shown in FIG. 16. In this case, the terminal 8 (FIG. 18) of the indication unit 10 is connected to the output of the main pulse counter 32 of the time interval forming unit 7 and the terminal 9 of the indication unit 10 is connected to the input 15 of the branch model 6.

Figure 13:
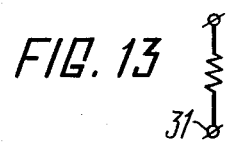

When the node model 28 is arranged as shown in FIG. 13, for branches associated with node D (branches II and VIII, FIG. 19a), the AND circuit of the model 28 of node D (FIG. 19b) is formed by the connection of the diodes 42 (FIG. 17) of the branch models 6 to the terminal 31 of the node model 28 with the aid of terminal jacks 17 (FIG. 19c) of the patch board 4.

Figure 20:
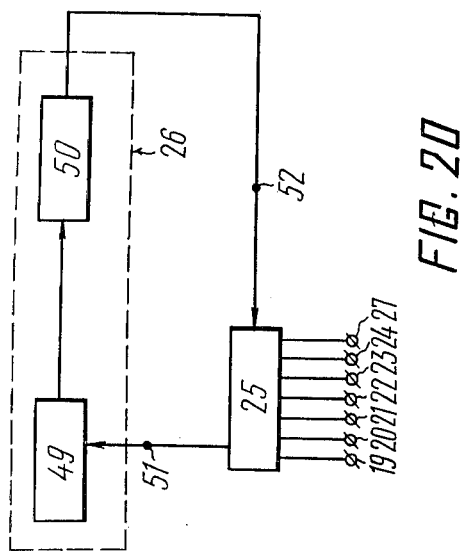
FIG. 20 is a block diagram of an embodiment of a calendar unit connected to the control subunit, according to the invention.

The calendar device 26 (FIG. 20) comprises a counter 49 and a decoder 50 of holiday time.

The input of the counter 49 is connected to an output 51 of the control subunit 25, and the outputs of the counter 49 are connected to the inputs of the decoder 50. The output of the decoder 50 is connected to an input 52 of the control subunit 25.

Figure 21:
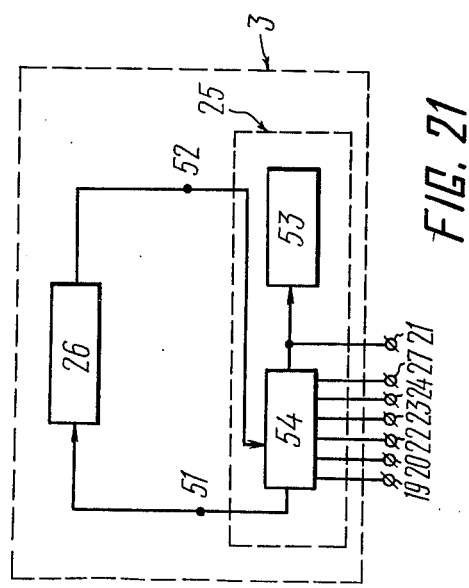
FIG. 21 is a block diagram of an embodiment of a control subunit connected to a counter and the calendar device according to the invention.

The control subunit 25 (FIG. 21) comprises a control block 54 and a pulse counter 53 connected thereto. The control block 54 is connected to the inputs 19, 20, 27, 52 and outputs 21, 22, 23, 24, 51 of the control subunit 25.

Figure 22:
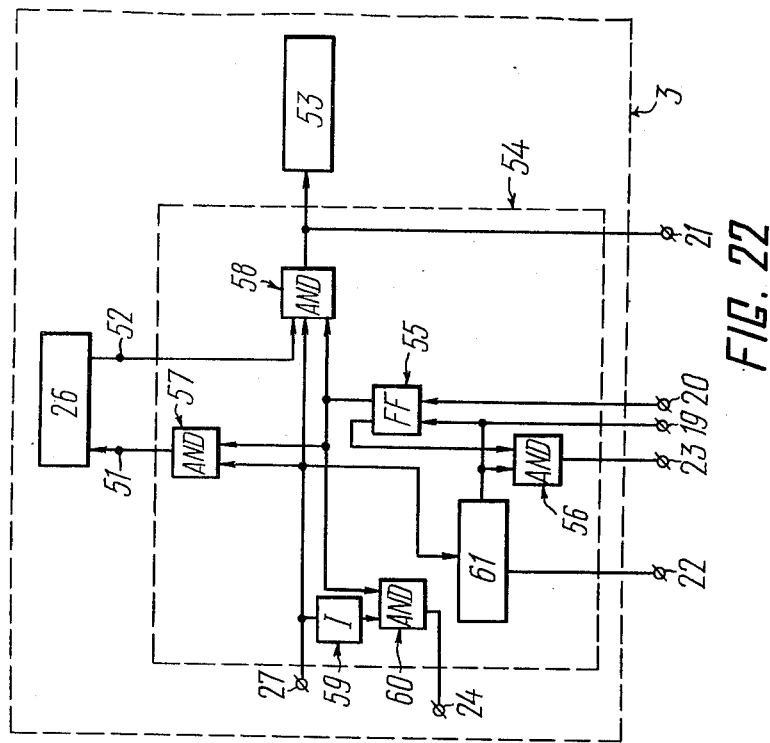
FIG. 22 is a block diagram of an embodiment of a control subunit connected to the calendar device and the counter, according to the invention.

The control block 54 (FIG. 22) includes AND circuits 56, 57, 58 and 60, a flip-flop 55, an inverter 59, and a generator 61 of single pulses.

The first inputs of the AND circuits 57 and 58 are connected to each other and to the input 27 which, in turn, is connected to the pulse generator 1 (FIG. 5b), while the second inputs of the AND circuits 57, 58 and 60 are connected to the output of the flip-flop 55; the third input of the AND circuit 58 is connected to the input 52 and, further, to the calendar device 26. The output of the AND circuit 57 is connected to the output 51 and, further, to the calendar device 26, while the output of the AND circuit 58 is connected to the input of the pulse counter 53 and to the output 21 of the control unit 3.

The input of the generator 61 is connected to the output 27, the first output thereof is connected to the output 22, the second output is connected to the first input of the AND circuit 56, to the 1 input of the flip-flop 55 and to the output 19 of the control unit 3; the 0 input of the flip-flop 55 is connected to the input 20 and the 0 output thereof is connected to the second input of the AND circuit 56 whose output is connected to the output 23 of the control unit 3.

The apparatus for analysis of the network diagram portion of FIG. 23a comprises a pulse genrator 1 (FIG. 2b), a control unit 3, a branch model unit 2, a node model unit 5 and a patch board 4.

The branch model unit 2 is made up of individual branch models 6 equal in number to production process steps covered by this portion of network diagram. For example, model 6 of branch $V_I$ corresponds to step I of the portion of FIG. 23a of the network diagram of FIG. 1, and model 6 of branch $V_V$ corresponds to step V.

Each branch model 6, comprising a time interval forming unit 7 and an indication unit 10, has its inputs 11, 12, 13 and 14 connected, respectively, to outputs 21, 22, 23 and 24 of the control unit 3, while an input 15 and an output 16 of the branch model 6 are connected to respective terminal jacks 17 of the patch board 4.

The time interval forming unit 7 includes a main pulse counter 32 having one of its inputs connected via the input 11 to the output 22 of the control unit 3 and the output connected via terminal 8 to the indication unit 10, an auxiliary pulse counter 35 whose input is connected to the second input of the main pulse counter 32, a flip-flop 33 one input whereof is connected via the input 15 of the branch model 6 to a terminal jack 17 of the patch board 4 and the second input is connected to the output of the auxiliary pulse counter 35, an AND circuit one input whereof is connected via the input 14 to the output 21 of the control unit 3, the other input is connected to the output of a flip-flop 39, and the output is connected to the second input of the main pulse counter 32 and to the input of the auxiliary pulse counter 35, the capacity of the main pulse counter 32 being equal to that of the auxiliary pulse counter 35.

The indication unit 10 comprises a flip-flop 40 having one of its inputs connected via terminal 8 to the time interval forming unit 7, a flip-flop 47 one input whereof is connected to the first input of the flip-flop 40 and the other input is connected via the input 12 to the output 23 of the control unit 3. Also included is a diode 42 one lead whereof is connected to the output of the flip-flop 47 and the other lead is connected via the output 16 of the branch model 6 to a terminal jack 17 of the patch board 4, an inverter 47 whose input is connected to the output 16. Also included is an AND circuit 48 one input whereof is connected to the output of the inverter 44, the other input is connected via the input 13 to the output 24 of the control unit 3 and the output is connected to the second input of the flip-flop 40, an AND circuit 43 one input whereof is connected to the output of the flip-flop 40, the second input is connected to the output of the inverter 44, the third input is connected via the input 12 to the output 23 of the control unit 3. In addition, there is an inverter 46 whose input is connected to the output of the AND circuit 43 and whose output is connected via terminal 9 to the input 15 of the branch model 6, and an indication element 45 connected to the output of the AND circuit 43.

The control unit 3 comprises a calendar device 26, a control subunit 25 which is connected via an output 51 to the input of the calendar device 26, via an input 52 to the output of the calendar device 26, via an input 27 to the output of the pulse generator 1, via the outputs 21, 22, 23 and 24 to the branch models 6 of the branch model unit 2, and via the input 20 and output 19 to those terminal jacks 17 of the patch board 4 which correspond to the starting and final event of the network diagram.

The calendar device 26 includes a pulse counter 49 having its input connected to the output 51 of the control subunit 25, and a decoder 50 whose inputs are connected to the outputs of the pulse counter 49 and whose output is connected to the input 52 of the control subunit 23.

The control subunit 25 comprises a pulse counter 53 and a control block 54 one output whereof is connected via the output 51 to the calendar device 26, the other outputs are connected via the outputs 21, 22, 23 and 24 to all the branch models 6 of the branch model unit 2, the first input is connected via the input 52 to the output of the calendar unit 26 and two other inputs are connected via the input 20 and output 19 to the patch board 4, the output 21 being also connected to the input of the pulse counter 53.

The control block 54 comprises a flip-flop 55 one input whereof is connected to the input 20 and the other input is connected to the output 19, an AND circuit 56 having one of its inputs connected to the 0 output of the flip-flop 55, the other input connected to the output 19 and the output connected to the output 23 of the control unit 3. Also there is an AND circuit 57 one input whereof is connected to the second output of the flip-flop 55, the other input is connected to the input 27, and the output is connected to the output 51, an AND circuit 56 one input whereof is connected to the input 27, the second input is connected to the input 52, the third input is connected to the second input of the flip-flop 55, and the output is connected to the output 24, and a generator 61 of single pulses, the input whereof is connected to the input 27, the first output is connected to the output 19, and the second output is connected to the output 22.

The operation of the proposed apparatus for analysis of network diagrams will be considered with reference to FIG. 23b.

First, information relating to the length of each branch or the duration of each production step, of the network diagram is introduced into the branch models 6 of the branch model unit 2. Specifically, this information is entered in the main counters 32 of the branch models 6 and is characterized by the number of pulses from the pulse generator 1, for each step; therewith, the auxiliary counters 35 are set to zero, and entered in the counter 49 of the calendar device 26 is the date of starting the netowrrk diagram. If this date is a working day, a "permitting" potential appears across the output of the decoder 50, and if the date is a holiday, an "inhibiting" potential appears across the output of the decoder 50.

On the patch board 4, the inputs 15 and outputs 16 of the branch models 16 and the terminals 31 of the node models 28 are interconnected, in accordance with the topology of the network diagram, with the aid of patch cords 18. After the connection by means of the patch board 4 is completed, there are formed, at the points of connection, AND circuits, as has been mentioned in connection with FIG. 19.

Serving as the inputs of these AND circuits are the outputs 16 of the branch models 6, connected to the terminal 31 of the node model 28. In the initial state, the outputs 16 are at the inhibiting potential.

The longest path in the network diagram is determined as follows.

Following the arrival of a trigger signal, the generator 61 produces single pulses applied to the terminals 22 and 19 and to the 1 input of the flip-flop 55. From the terminal 19, the single pulse is delivered to the terminal jack 17 of the patch board 4, corresponding to the starting node of the network diagram. This signal is then applied through the terminal 31 to the node model 28 corresponding to the starting node $P_A$ of the network diagram and, further, through the inputs 15 of the branch models 6 associated with this node (model of branch $V_I$). The single pulse appearing at the terminal 19 sets the flip-flop 55 and the flip-flops 33, forming the time interval of those branch models which have their inputs 15 connected to the starting node of the network diagram (model 6 of branch $V_I$), to the 1 state.

The permitting potential from the 1 output of the flip-flop 55 is applied to the inputs of the AND circuits 57, 58 and 60, while the inhibiting potential from the 0 output of the flip-flop 55 is applied to the input of the AND circuit 56. Thus, the pulses from the generator 1, at the input 27 of the control unit 3, are permitted to pass, via the AND circuit 57 and output 51, to the counter 49 of the calendar device 26 and, via the AND circuit 60 and output 21, to the counter 53 and to all the branch models 6 of the branch model unit 2.

The permitting potential from the 1 output of the flip-flop 33 forming the time interval of the model 6 of branch $V_I$ is applied to the input of the coincidence circuit 34, permitting thereby the passage of pulses from the input 14 via the AND circuit 34 to the main counter 32 and to the auxiliary counter 35.

Thus, following the trigger signal, pulses from the generator 1 start to be applied to the pulse counter 49 of the calendar device 26, to the counter 53 of the control subunit 25 and to the counters 32 and 35 of those branch models 6 whose flip-flops 33 are in the 1 state.

When the date corresponding to a holiday appears at the outputs of the pulse counter 49 of the calendar device 26, an inhibiting potential appears across the output of the decoder 50. Thereby, pulses are not allowed to pass to the counter 53 and to the counters 32 and 35 of all the branch models, which corresponds to holidays being left out. At the same time, the counter 49 of the calendar device 26 continues to count pulses from the generator 1.

After the counters 32 and 35 have counted the number of pulses, corresponding to the duration of step I, i.e. length of branch I, of the network diagram, an overflow pulse appears at the output of the counter 32. This pulse is applied via terminal 8 to the indication unit 10. Before an overflow pulse appears at the output of the counter 35, there should be applied to its input a number of pulses equal to the difference between the total number of pulses that the counter may receive and the number of pulses that have already been applied thereto by the moment an overflow pulse appears at the output of the counter 32.

After the appearance of an overflow pulse at the output of the counter 35, the counter 32 stores a number corresponding to the duration of a particular step. The overflow pulse of the counter 35 is applied to the second input of the flip-flop 39 setting it to the 0 state. Thus, an inhibiting potential appears across the output of the flip-flop 33, which is applied to the input of the AND circuit 34 and inhibits feeding of pulses to the counters 32 and 35.

The time interval termination pulse appearing at the output 8 of the time interval forming unit 7 is applied to the indication unit 10. From the terminal 8, this pulse is then fed to the 1 input of the indication flip-flop 40 and to the 1 input of the time interval termination flip-flop 47, setting both flip-flops to the 1 state. Therewith, a permitting potential appears across the output of the flip-flop 40, which is applied to the input of the AND circuit 43, and the permitting potential appearing across the output of the flip-flop 47 is applied to the input of the diode 42 (in this case, the potential is positive).

In case a node is associated with one branch (as shown in FIG. 23), a permitting signal (in this case, a high positive potential) appears across the output of the diode 42 (across the output 16 of the model 6 of branch $V_I$ and across the terminal 31 of the model 28 of node $P_B$ associated with this branch). This signal is fed to the input of the inverter 44 of the model 6 of branch $V_I$, inverted therein and applied to the input of the AND circuit 48, thereby inhibiting feeding of pulses from the generator 1, via the inverter 59 of the control unit 3, input 13 and AND circuit 48, to the 0 input of the flip-flop 40.

If a node is associated with a plurality of branches, (as shown in FIG. 19a), a permitting signal at the outputs 16 of the models 6 of branches $V_{II}$ and $V_{VIII}$, having their ends connected to the terminal 31 of the model 28 of branch $P_D$, will only appear when permitting potentials appear across the outputs of the flip-flops 47 of the models 6 of branches $V_{II}$ and $V_{VIII}$. This is due to the fact that the connection of the diodes 42 of the models 6 of branches $V_{II}$ and $V_{VIII}$ to the resistor of the model 28 of node $P_D$ forms an AND circuit (in this case, for positive signals).

Should the permitting potential across the output of the flip-flop 47 of the model 6 of branch $V_{VIII}$ appear earlier than across the output of the flip-flop 47 of the model 6 of branch $V_{II}$, a permitting signal will appear at the terminal 31 of the model 28 of node $P_D$ simultaneously with the permitting potential across the output of the flip-flop 47 of the model 6 of branch $V_{II}$, with no inhibiting potential appearing therewith across the outputs of the inverters 44 of the models 6 of branches $V_{II}$ and $V_{III}$ and pulses from the generator 1 setting, via the input 27, output 24 (FIG. 23), input 13 and AND circuit 48, the flip-flops 40 of the models 6 of branches $V_{II}$ and $V_{VIII}$ to the 0 state (FIG. 23).

A permitting signal will appear at the terminal 31 of the model 28 of node $P_D$ when a permitting potential appears across the output of the flip-flop 47 of the model 6 of branch $V_{II}$.

In this case, across the outputs of the inverters 44 of the models 6 of branches $V_{II}$ and $V_{VIII}$ there appears an inhibiting potential which inhibits feeding of pulses from the generator 1 via the AND circuit 48 of the models 6 of branches $V_{II}$ and $V_{VIII}$ to the 0 inputs of the flip-flops 40. Thus, following the appearance of a permitting signal at the terminal 31 of the model 28 of node $P_D$, the flip-flops 40 of those branch models whose time intervals have been formed last in the node will be in the 1 state. Thus, the state of the flip-flop 40 is indicative of the end of a branch associated with a particular node.

The permitting signal appearing at the terminal 31 of the model 28 of node $P_B$ (FIG. 23) is applied via terminal jacks 17 and patch cords 18 of the patch board 4 to the inputs 15 of the branch models 6 associated with this node (in this case, to the input of the model 6 of branch $V_V$).

The process of forming the time interval in the model 6 of branch $V_V$ and setting the flip-flops of this model to a respective state is similar to the one described above.

The process of determining the longest path of the network diagram is terminated when a permitting signal appears in the final node. This signal sets, via the input 20 of the control unit 3, the flip-flop 55 of the control block 54 to the 0 state, whereby feeding of pulses from the generator 1 to the calendar device 26, pulse counter 53 and branch model unit 2 discontinues.

As a result, the pulse counter 53 stores the number of pulses corresponding to the length of the remaining portion of the path.

If feeding of pulses to the counter 53 is stopped by a signal appearing at the input 15 of the selected branch model, one can determine the earliest date of starting the selected step of the process in accordance with the network diagram.

If feeding of pulses to the counter 53 is stopped by a signal appearing at the output of the flip-flop 47 of the selected branch model, the counter 53 stores the number of pulses corresponding to the earliest date of terminating the selected step of the process in accordance with the network diagram.

Following the appearance of a signal in the final node of the network diagram, the counter 49 of the calendar device 26 stores the date of termination of the network diagram.

After the network diagram has been calculated (at the moment of appearance of a permitting signal in the final node of the network diagram), the flip-flops 40 of the branch models of the network diagram being in the 1 state determines the branches belonging to the "tree" of the longest paths having their starting points in the initial node and end points in one of the nodes of the network diagram.

The branches belonging to the longest path between the initial and final nodes of the network diagram are determined in the herein-proposed apparatus for analysis of network diagrams as follows.

After the flip-flop 55 of the control unit 3 has been set to the 0 state, an enabling potential should be applied to the third inputs of the AND circuit 43 of all the branch models 6 of the network diagram, and an inhibiting potential should be applied to the final node $P_C$.

The inhibiting potential applied to the final node of the network diagram is inverted by the inverters 44 of the branch models having their outputs 16 associated with the final node $P_C$ of the network diagram. The output of the inverters 44 of all the branch models is applied to the inputs of the AND circuits 43.

In case the flip-flop 40 of a branch model is in the 1 state, i.e. this particular branch is the last to terminate in the node, an enabling potential appears across the output of the AND circuit 43.

If the flip-flop 40 of a branch model is in the 0 state, i.e. the branch in question is not the last to terminate in the node, no enabling potential will appear across the output of the AND circuit 43.

The enabling signal from the output of the AND circuit 43 is applied to an indication element, which may be an incandescent lamp or any other appropriate indicating means, and to the input of the inverter 46. From the output of the latter, the inverted potential (inhibiting potential) is applied to the node associated wherewith is the input 15 of the branch model under consideration.

Thus, inhibiting potentials will be applied to those nodes of the network diagram which are associated with the final node through branches which are the last to terminate in these nodes; these branches are precisely those belonging to the longest path.

Other characteristics of the network diagram are determined in a similar fashion.

The disclosed apparatus for analysis of network diagrams permits the following information to be obtained from a network diagram:

a. the length and configuration of the longest path;
b. the earliest terms of commencement and termination of any selected step of a process;
c. the latest possible terms of commencement and termination of any selected step of a process;
d. time reserves for the selected steps;
e. the configuration of the paths of the critical zone corresponding to a preset intensity ratio;
f. the state of affairs of the work being done at any selected moment;
g. the calendar terms of commencement and termination of work with due consideration for the peculiarities of the existing calendar;
h. visual display of the tree of the maximal paths in the network;
i. the calculation of the cost and source limitations of the network models.

The apparatus for analysis of network diagrams offers the following advantages owing to which it can find extensive application as a technical means in various systems of network diagram planning and control.

— structural simplicity and physical analogy between the apparatus and network diagram;

— ease of operation eliminating the necessity of programming and the problem of man-machine interaction;

— simplicity of variation of the starting data, elimination of the time lag between the moment of introduction of the varied data and that of obtaining the results, which time lag normally occurs when use is made of program-controlled digital computers;

— high graphical display of the results, which, together with the swiftness of obtaining these results, makes it possible to include the investigator with his experience in the feedback of the man-machine system when non-formal or hard-to-realize methods of optimization of diagrams are practiced;

— high degree of automation of data input and output;

— possibility to easily combine several such apparatus into a system for solving complicated problems.

The branch models in the herein-disclosed apparatus being functional two-terminal devices and the node models being functional single-terminal devices, the apparatus can be easily constructed as a solid-state structure, and the patch boards thereof are extremely simple.

The digital way of introducing information into the apparatus does not call for incorporation therein of digital-analog or analog-digital converters, and the apparatus can be readily built into a D-A system.

The apparatus can be widely used in various fields of science, technology and business activity.

It can be used either at the stage of elaborating network diagrams, or at the stage of controlling a process according to the method of network diagram planning and control in the following spheres of activity:

a. scientific research;
b. industry;
c. defence and warfare;
d. construction;
e. business and commerce;
f. education;
g. biotechnical and medical systems;
h. transport and communications.

The apparatus can also be used for solving other kinds of problems related to the extreme paths on diagrams.

The incorporation of interchangeable patch boards in the apparatus saves time at planning and control along several diagrams.

The graphical display of the solutions obtained and the swiftness with which they are obtained, in an apparatus embodying the present invention, permits of utilizing to the full the advantages inherent in special-purpose machines and systems.

An administrator or an author of a project is offered a possibility of viewing directly the results of changes and variations introduced into the models of diagrams. In this case, the apparatus serves as a counsellor-machine and as a source of reference to the parameters of a diagram model.

What is claimed is:

1. An apparatus for analysis of network diagrams, comprising: a pulse generator; a branch model unit, the number of branch models wherein is equal to that of branches in the network diagram and each branch model includes a time interval forming unit having an input (15) which serves as the input of said branch model; a branch model state indication unit having at least three terminals, one of the terminals being connected to the output of said time interval forming unit, the second terminal (9) being connected to said input (15) of said branch model, and the third terminal serving as the output (16) of said branch model; a patch board whose terminal jacks (17) are connected to the inputs (15) and outputs (16) of said branch models and, through patch cords (18), to one another in accordance with the topology of the network diagram; and a control unit including a calendar device (26) and a control subunit (25) connected to said calendar device, patch board, pulse generator and branch model unit.

2. An apparatus as claimed in claim 1, wherein said time interval forming unit comprises: a main pulse counter (32); a time interval forming flip-flop (33), one input whereof serves as the input (15) of said time interval forming unit and as the input (15) of said branch model and is connected to one of the terminal jacks (17) of said patch board, while the other input is connected to the output of said main pulse counter (32); and an AND circuit (34), one input whereof is connected to said control unit, the other input is connected to the output of said time interval forming flip-flop (33), and the output is connected to the input of said main pulse counter (32), the output of the main pulse counter (32) serving as the output of the time interval forming unit.

3. An apparatus as claimed in claim 1, wherein said time interval forming unit comprises: a main pulse counter (32); an auxiliary pulse counter (35) whose input is connected to the input of said main pulse counter (32); a time interval forming flip-flop (33), one input whereof serves as the input (15) of said time interval forming unit and as the input (15) of said branch model and is connected to one of the terminal jacks (17) of said patch board, while the other input is connected to the output of said auxiliary pulse counter (35); and an AND circuit (34), one input whereof is connected to said control unit, the other input is connected to the output of said time interval forming flip-flop (33), and the output is connected to the input of said main pulse counter (32), the output of the main pulse counter (32) serving as the output of the time interval forming unit.

4. An apparatus as claimed in claim 1, wherein said indication unit comprises: an indication flip-flop (40), one input whereof is connected to the output of said time interval forming unit, the other input is connected via a feedback circuit (41) to the output (16) of said branch model, and the output is connected via a diode (42) is connected to the same output (16) of said branch model; an AND circuit (43), one input whereof is connected to the output of said indication flip-flop (40), and the other input is connected to said control unit; a first inverter (46), the input whereof is connected to the output of said AND circuit (43), and the output is connected to the input of said time interval forming unit; an indication element (45) connected to the output of said AND circuit; and a second inverter (44), the input whereof is connected to the output (16) of said branch model, and the output is connected to a third input of said AND circuit (43).

5. An apparatus as claimed in claim 1, wherein said indication unit comprises: an indication flip-flop (40), one input whereof is connected to the output of said time interval forming unit, and the other input is connected via a feedback circuit to the output (16) of said branch model; a time interval termination flip-flop (47), one input whereof is connected to the output of said time interval forming unit, the other input (12) is connected to said control unit, and the output is connected via a diode (42) to the output (16) of said branch model; an AND circuit (43), one input whereof is connected to the output of said indication flip-flop (40), and the other input (12) is connected to said control unit; a first inverter (44) having its input connected to the output (16) of said branch model and its output connected to the third input of said AND circuit (43); a second inverter (46) having its input connected to the output of said AND circuit (43) and its output connected to the input of said time interval forming unit; and an indication element (45) connected to the output of said AND circuit (43).

6. An apparatus as claimed in claim 1, wherein said indication unit comprises: an indication flip-flop (40), one input whereof is connected to the output of said time interval forming unit; a first AND circuit (48), one input (13) whereof is connected to said control unit, and the output is connected to the second input of said indication flip-flop (40); a time interval termination flip-flop (47), one input whereof is connected to the output of said time interval forming unit, the other input (12) is connected to said control unit, and the output is connected via a diode (42) to the output (16) of said branch model; a first inverter 44 having its input connected to the output 16 of said branch model and its output connected to the third input of said second AND circuit (43) and to the second input of said first AND circuit (45); a second inverter (46) having its input connected to the output of said second AND circuit (43) and its output connected to the input (15) of said time interval forming unit; and an indication element (45) connected to the output of said second AND circuit (43).

7. An apparatus as claimed in claim 1, wherein said calendar device comprises: a counter (49) whose input is connected to a first output (51) of said control subunit; and a decoder (50), the inputs whereof are connected to the inputs of said counter (49), and the output is connected to a first input (52) of said control subunit (25).

8. An apparatus as claimed in claim 1, wherein said control subunit (25) comprises: a generator (61) of single pulses, the input (27) whereof is connected to the output of said pulse generator, the first output (22) is connected to one of the inputs of the main counter (32) in each said branch model (6), and the second output (19) is connected to the terminal jack (17) of said patch board (4), corresponding to the initial node of the network diagram; a first AND circuit (60) whose output (24) is connected to the first input (13) of the first AND circuit (48) of said indication unit in each branch model; a second AND circuit (57), one input whereof is connected to the first input of said first AND circuit, the other input is connected to said pulse generator and to said input (27) of said generator (61) of single pulses, and the output (51) is connected to the input of said calendar device (26); a third AND circuit (58), one input whereof is connected to said pulse generator, the second input is connected to the first input of said first AND circuit (60), the third input is connected to the input (52) of said control subunit, and the output (21) is connected to the second input of the AND circuit (34) of said time interval forming unit in each branch model; an inverter (59) having its input connected to said pulse generator and to said first input of said third AND circuit (58) and its output connected to the second input of said first AND circuit (60); a flip-flop (55), one input whereof is connected to the second input of said generator (61) of single pulses, the other input (20) is connected to the terminal jack (17) of said patch board, corresponding to the final node of the network diagram, and a first output of the flip-flop (55) is connected to the first input of said first AND circuit (60); a fourth AND circuit (56), one input whereof is connected to the second output of said generator (61) of single pulses, the other input is connected to the second output of said flip-flop (55), and the output (23) is connected to the second inputs 12 of said first AND circuits (43) of said indication units in each branch model; and a pulse counter (53) whose input is connected to the output (21) of said third AND circuit (58).

9. An apparatus for analysis of network diagrams, comprising; a pulse generator; a branch model unit, the number of branch models wherein is equal to that of branches in the network diagram and each branch model includes a time interval forming unit having an input (15) which serves as the input of said branch model; a branch model state indication unit having at least three terminals, one terminal being connected to the output of said time interval forming unit, the second terminal (9) being connected to said input (15) of said branch model, and the third terminal serving as the output (16) of said branch model; a node model unit, the number of node models wherein is equal to that of nodes in the network diagram; a patch board whose terminal jacks (17) are connected to the inputs (15) and outputs (16) of said branch models, to terminals (31) of said node models (28) and, through patch cords (18), to one another in accordance with the topology of the network diagram; and a control unit including a calendar device (26) and a control subunit (25) connected to said calendar device, patch board, pulse generator, branch model unit and node model unit.

10. An apparatus as claimed in claim 9, wherein said node model (28) is made as a resistor, one end whereof is the terminal (31) of said node model and is connected to one of the terminal jacks (17) of said patch board, and the other end is connected to a power supply.

11. An apparatus as claimed in claim 9, wherein said node model (28) comprises: a counter (36) of regeneration of time intervals of said branch models having their inputs (15) connected to said node model (28); a regeneration flip-flop (39), one input whereof is connected to the ouput of said counter (36) of regeneration of time intervals and the other input (30) is connected to said control unit; a first AND circuit (37), one input whereof is connected to the output of said regeneration flip-flop (39) and the output serves as the terminal (31) of said node model (28) and is connected to one of the terminal jacks (17) of said patch board; and a second AND circuit (38), one input whereof is connected to the output of said first AND circuit, the other input (29) is connected to said control unit, and the output is connected to the input of said counter (36) of regeneration of time intervals.

* * * * *